United States Patent Office 3,075,444
Patented Jan. 29, 1963

3,075,444
PHOTOGRAPHIC CAMERA WITH INTERCHANGEABLE OBJECTIVE UNITS
Heinz Küppenbender, Heidenheim (Brenz), Germany, assignor to Zeiss Ikon Aktiengesellschaft, Stuttgart, Germany
Filed Mar. 23, 1960, Ser. No. 17,102
Claims priority, application Germany Mar. 26, 1959
9 Claims. (Cl. 95—45)

Photographic cameras are known which are provided with interchangeable objective units and in which the camera is provided with an adjustable member for focusing which is common to all said interchangeable units. In some cameras a central shutter is provided on each of said interchangeable objective units but such a shutter increases the costs of each of said units.

In order to reduce the high costs of such cameras it was proposed already to provide each interchangeable objective unit with only a diaphragm mechanism, while the central shutter is arranged in the camera itself. The disadvantage of such arrangement is, however, that during the adjustment of the objective in axial direction, which is necessary for focusing, the distance between the diaphragm segments and the shutter segments will be changed. This relative displacement will decrease the brightness and the definition of the image on the film. This phenomenon is particularly serious when long axial extensions of the interchangeable objective units take place.

The object of the present invention is to eliminate these disadvantages and to provide a photographic camera with substantially improved optical properties.

A further object of this invention is to provide a photographic camera in which the adjusting device on the camera is common to all interchangeable objective units and is arranged in such a manner that it also effects an axial adjustment of the shutter. In fact, the shutter will be axially displaced together with the diaphragm when the focusing means is operated, thus maintaining the same axial distance between the shutter and the diaphragm.

Other and further objects of the invention will appear from the following description.

The accompanying drawings which form a part of the application disclose several embodiments of the invention. Like numerals are employed in the drawings to indicate like parts.

FIG. 1a shows the development of a scale ring provided with a plurality of scales, each for a different objective;

Figure 4:
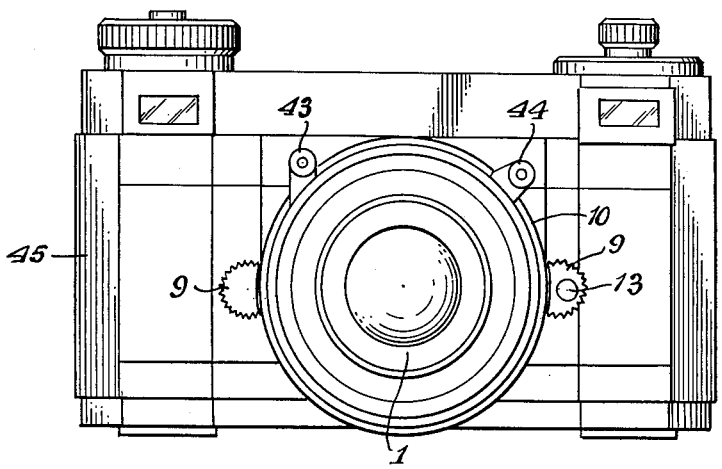
FIG. 4 shows the front elevation view of a camera according to the invention.
Figure 5:
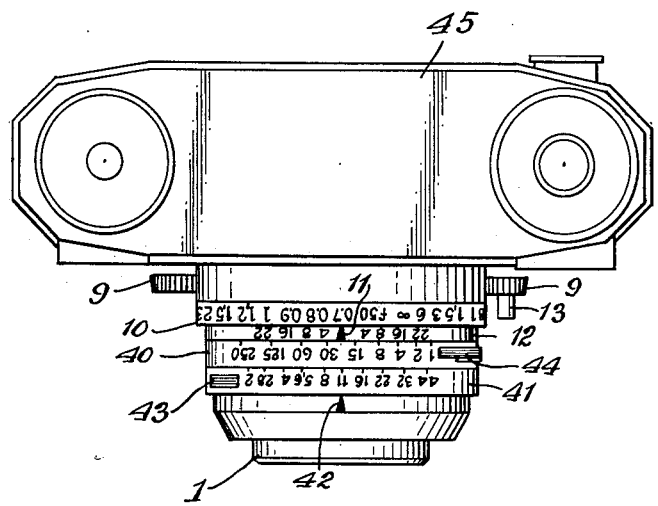
FIG. 5 is a top elevation view of the camera shown in FIG. 4.

Referring first to the FIGS. 4 and 5, the photographic camera has attached to its body 45 an objective 1 provided with two adjusting handles 9 for focusing. One of these handles 9 carries the manually operable push button 13, the functioning of which will be described presently. 43 and 44 indicate actuating means for the adjustment of the diaphragm adjusting ring 41 and the shutter speed adjusting ring 40, respectively.

The scales provided on the focussing member 10 correspond to the plurality of the interchangeable objective units selectively adapted to be used with the camera. The indicating mark 11 for the different distance ranges is provided on a scale carrier 12 disposed adjacent said distance scale ring 10. To both sides, namely to the left and right of said mark 11 on the scale carrier 12 is arranged a diaphragm scale for the identification of the depth of focus. The above mentioned shutter speed adjustment member 40 and the diaphragm adjustment member 41 are arranged next to said scale carrier 12 in axial direction. A common indicating mark 42 serves for said members 40 and 41.

Figure 1:
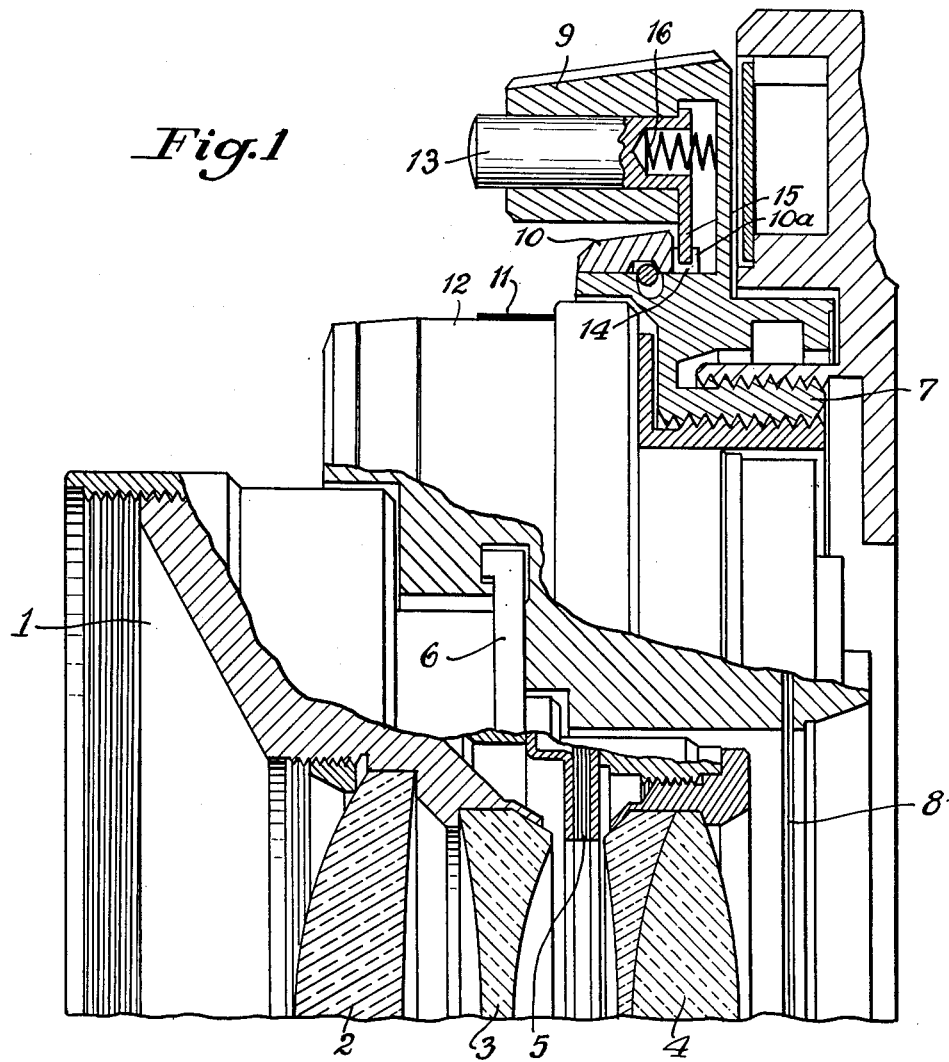
FIG. 1 is a sectional view taken along the optical axis and partly a side elevation view of a camera objective unit when attached to a camera casing.
Figure 2:
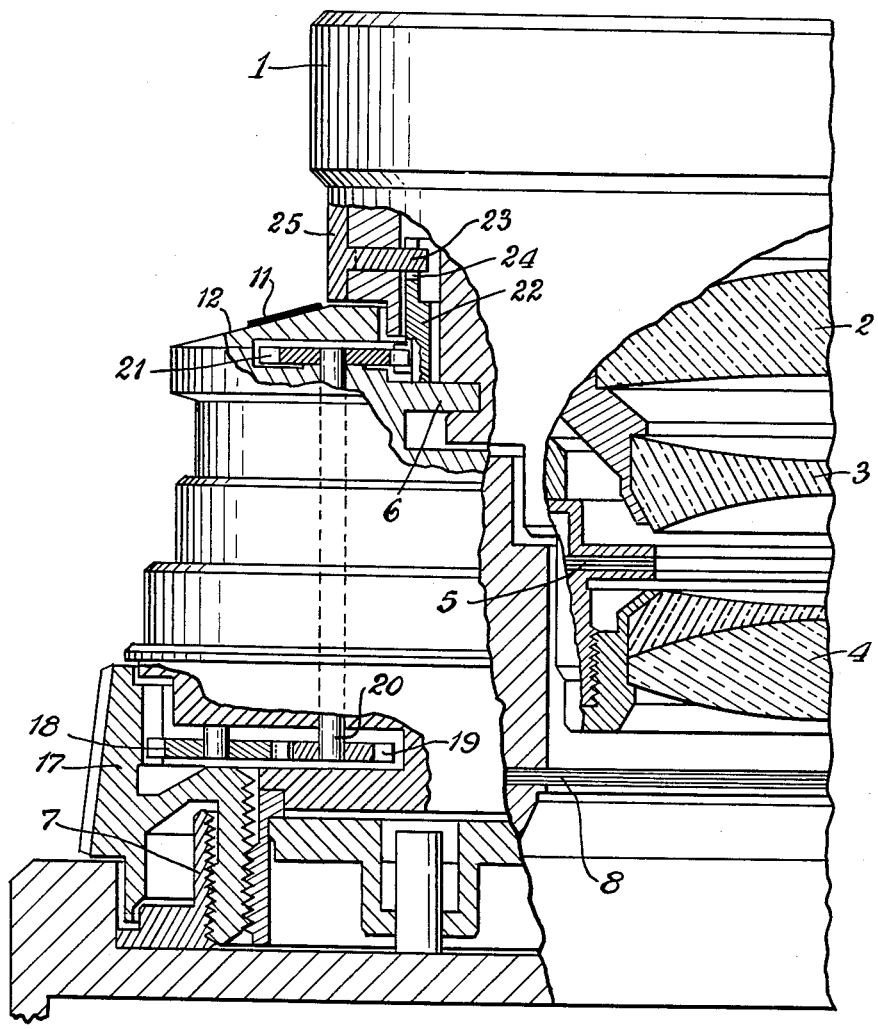
FIG. 2 shows another embodiment of the invention in which each interchangeable objective is provided with its own distance scale ring.
Figure 3:
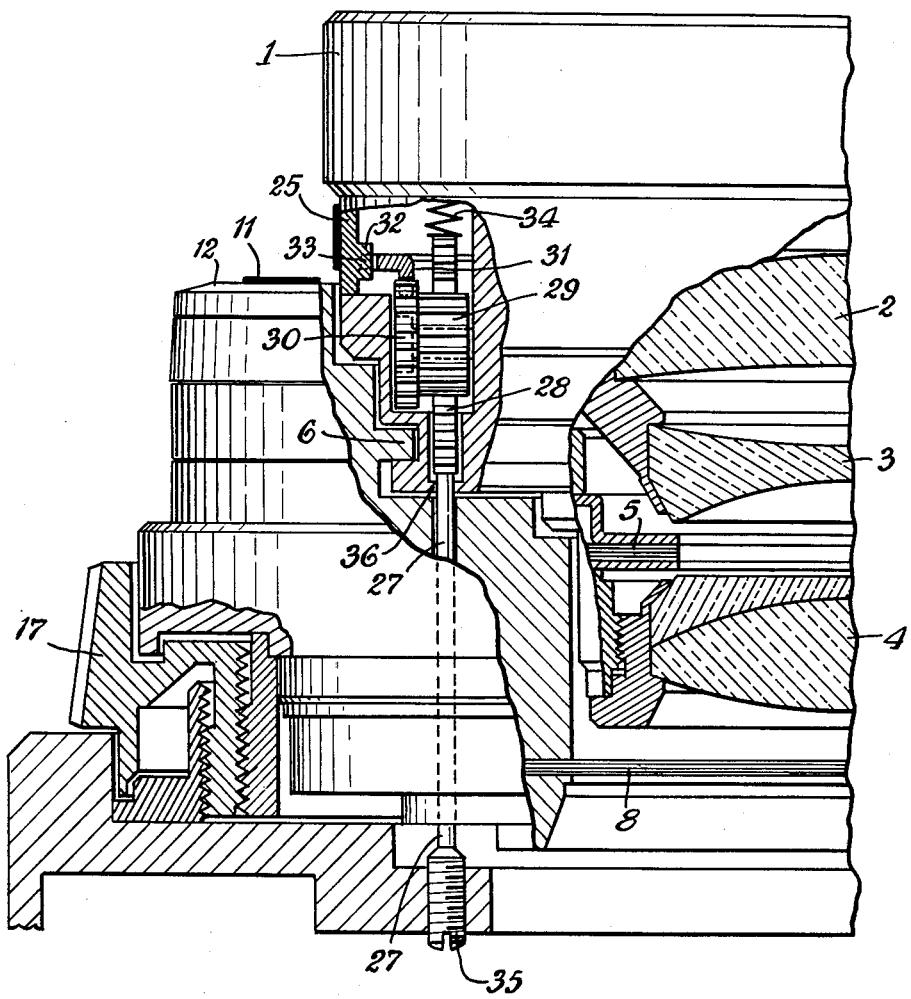
FIG. 3 shows a still further embodiment of the camera similar to that shown in FIG. 2.

The FIGS. 1 to 3 illustrate in axial sectional view complete objective units 1, the lenses of which are designated with 2, 3 and 4, the diaphragm with 5 and the shutter with 8.

Referring particularly to FIG. 1, the objective 1 is connected to a part on the camera body by means of a bayonet joint 6. The camera body carries an adjustment device 7 for effecting an axial displacement of the objective 1. The device 7 surrounds and contains the central shutter 8. FIG. 1 shows only one of the two handles for the distance adjustment. The design of the adjustment device 7 is such that the parts which change their position perform only an axial movement relative to the camera body.

When any one of the handles 9 for focussing is actuated, the objective 1 will be axially displaced together with the diaphragm mechanism 5 and the shutter mechanism 8, which latter is arranged concentrically around the objective so that during all adjustments and in all adjusted positions the distance between the diaphragm blades and the shutter blades will remain the same. This has the result that the operating conditions of the objective will always remain the same in any one of its axially displaced positions, and that the quality of the picture produced by the objective will also be always the same. Further advantages are that the optical qualities of the lenses can be fully utilized even when the objective is very far axially displaced. In this manner the invention permits the use of relatively inexpensive objective units which do not have their own shutter mechanism for producing high quality pictures, which heretofore could be obtained only with expensive interchangeable objective units, each having its own shutter mechanism.

Numeral 10 indicates an annular scale carrying ring disposed on the circumference of the adjustment device 7 of the camera. In the embodiment of the invention shown in FIG. 1, there are provided the same number of distance scales as there are provided interchangeable objective units of different focal length. One of this plurality of scales for these different objective units is shown in its developed form in FIG. 1a. It is assumed that in the illustrated case the camera operates with a standard objective of the usual focal length $f=50$ mm. The scale ring 10 is so arranged that the distance scale associated with the 50 mm. objective is opposite the mark 11, on both sides of which the diaphragm scales 12 and 12a are arranged so as to permit a determination of the available depth of focus range.

The scale ring 10 is arrested in its adjusted position by a latch. When the objective is to be replaced by another one, for instance by a wide angle objective, the necessary rotary adjustment of the ring 10 is effected by depressing the button 13 provided on one of the adjusting handles 9 against the action of a spring 16. A radial projection 15 on the button 13 cooperating with slots 14 in a flange 10a of the scale ring 10 is moved out of its slot 14 so that the scale ring 10 can be rotated. The rotation of the ring 10 is continued until the desired new distance scale, for instance belonging to an objective having a focal length of f=35 mm., is positioned opposite the mark 11. In accordance with this new adjustment for another objective the scale ring will be locked in its position by the button 13 whose radial projection 15 will enter a corresponding slot 14 in the flange 10a.

The adjusting device 7 of the axial adjusting gearing is arranged in such a manner that when viewed from the plane of the shutter blades it will extend in the axial direction of the objective and may even project axially beyond the diaphragm 5. This arrangement permits large axial extensions of the adjusting device 7 and at the same time due to the movement of the objective into the camera will enable the use of short distances between the rear lens 4 and the image plane.

Instead of using a plurality of distance scales on a ring 10 which is arranged on a portion of the adjusting device 7 which is carried by the camera body and which ring 10 is manually adjusted to correspond to the objective used with the camera, it is also possible to provide each of the interchangeable objective units with its own distance scale. Since the distance adjusting device 7 is attached to the camera body, it is possible according to a further embodiment of the invention to transmit the adjusting movement to the distance scale on the respective objective. As shown in FIG. 2 of the drawings, gear wheels are provided for this purpose. These gear wheels utilize the rotary movement of the distance adjusting device 7 which is arranged on the camera. This rotary movement which is produced by the focus adjustment of the objective is transmitted over a shaft to the objective and then is transmitted by further gears and a clutch to the distance scale ring of the objective. In FIG. 2 the interchangeable objective 1 is again attached to the camera by a bayonet joint 6. The adjusting device 7 surrounds the shutter mechanism 8. When the distance adjusting member 17 is rotated the objective is axially adjusted by the device 7. The distance adjusting member 17 has the form of an internal gear ring which is in engagement with a spur gear 18. The latter in turn is in engagement with a spur gear 19 attached to one end of a shaft 20 extending parallel to the optical axis. The other end of the shaft 20 has attached thereto a gear 21 meshing with an external gear ring 22 disposed concentrically around the optical axis. A ring 25 carrying a distance scale is rotatably mounted on the mount of the objective and is actuated over a clutch 23, 24 by the ring 22.

The non-rotatable scale ring 10 with the index mark 11 thereon is arranged adjacent the rotatable scale ring 25. Of course, the non-rotatable ring 10 is axially displaced with the objective when the member 17 is rotatably adjusted.

In accordance with a further embodiment of the invention as shown in FIG. 3, it is also possible to utilize the axial displacement caused by the device 7 between the stationary parts of the camera and the parts participating in the distance adjustment in forward direction for the operation of the distance scale ring of the objective.

According to the embodiment shown in FIG. 3 this movement is transmitted by means of a rod 27 and a rack bar 28 which are movable relative to the respective stationary members and engage the gears 29 and 30 on the objective.

The rack bar 28 is held in constant engagement with the rod 27 by a spring 34. Numeral 35 indicates an adjusting screw used for positioning the objective corresponding to the indications of the distance scale. The gear 30 engages an exteriorly toothed ring 31 concentrically arranged around the optical axis. The ring 31 rotates the distance scale ring 25 on the objective by a clutch connection 32, 33.

The scale ring 10 with the mark 11 and with the two depth of focus scales 12 and 12a is positioned adjacent the distance scale ring 25.

Numeral 36 indicates the separating surface between the associated parts, namely the rod 27 and the rack bar 28, which surface is exposed when the objective is removed from the device 7 on the camera. The arrangement of these parts is such that when the objective is again attached to the device 7 on the camera, the parts 27 and 28 will again be in engagement with each other, as shown in FIG. 3.

The embodiments of the invention as shown in FIGS. 2 and 3 provide the solution of the problem of effecting an axial adjustment of the central shutter when the latter is mounted on the camera also when interchangeable objectives are used of which each is provided with its own distance scale. These embodiments also solve the problem of a transmission of the adjusting movements of the camera to the distance scales of the objectives as particularly shown in FIGS. 2 and 3.

Figure 6:
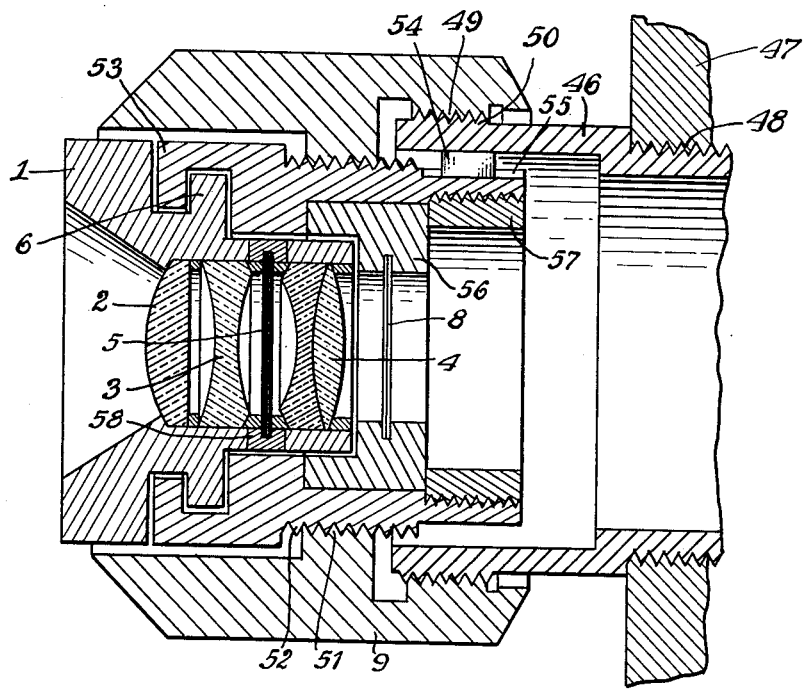
FIG. 6 illustrates diagrammatically the adjustability of the camera objective with the shutter and diaphragm.

In FIG. 6 numeral 1 is again the objective barrel in which there are the front lens 2, the centre lens 3 and the rear lens element 4. In between the centre lens 3 and the rear lens element 4 there are the diaphragm blades 5 controlled by the diaphragm control mechanism 58. By means of the bayonet joint 6 the objective barrel 1, which is completely interchangeable, is attached to a bushing 53 that is moved axially forward and back when operating the distance adjusting gear. The bushing 53 houses besides the shutter mechanism 56 with the shutter blades 8, the shutter mechanism being secured to the bushing 53 by means of a set ring 57.

This figure clearly shows that when actuating the adjusting handle 9 both the objective with the diaphragm blades 5 and the shutter 56 with its shutter blades 8 are moved simultaneously and the hitherto experienced change of the distance between the plane of the diaphragm blades and that of the shutter blades cannot take place any longer.

The distance adjusting gear proper is built-up as follows.

In one opening of the camera front panel, of which here is only shown the part 47 of the body, the bushing 46 is firmly screwed in by the thread 48. The bushing 46 has an adjusting external thread 50 cooperating with an adjusting internal thread 49 of the adjusting handle 9 made likewise as a cylindrical part. Besides the bushing 46 has a square piece 54 protruding at the inner side, the so-called guide pin.

The adjusting handle 9 has two separate thread pieces, firstly the aforementioned thread piece 49 mating with 50 and secondly the thread piece 51 cooperating with the thread piece 52 of the aforementioned bushing 53. The mode of operating is now that when rotating the distance adjusting handle 9 the bushing 53 wishes to make a rotation in connection with a translation in the one or the other sense. By the guide pin 54 running in its slot 55 the rotation, however, is blocked and it remains only the translation, that is to say the axial movement forwards or backwards according to the direction of the rotation of the adjusting handle 9.

What I claim is:

1. In a photographic camera provided with an interchangeable objective unit and adapted to accommodate individual objective units of different focal lengths, a camera body, a diaphragm mechanism mounted in said objective unit, an adjusting device on said camera body provided with a part for detachably receiving said objective unit and for displacing it with its diaphragm mechanism in axial direction, a central shutter carried by said part whereby upon operation of said adjusting device said shutter being axially displaced with said part while the axial distance between said shutter and said diaphragm mechanism remains unchanged, said adjusting device extending concentrically about the optical axis of said objective unit and projecting forwardly from the front wall of said camera body at least to the place at which the diaphragm mechanism in said objective unit is arranged.

2. In a photographic camera provided with an interchangeable objective unit and adapted to accommodate individual objective units of different focal lengths, a camera body, a diaphragm mechanism mounted in said objective unit, an adjusting device on said camera body provided with a part for detachably receiving said objective unit and for displacing it with its diaphragm mechanism in axial direction, a central shutter carried by said part whereby upon operation of said adjusting device said shutter being axially displaced with said part while the axial distance between said shutter and said diaphragm mechanism remains unchanged, said adjusting device extending cencentrically about the optical axis of said objective unit and projecting forwardly from the front wall of said camera body at least to the place at which the diaphragm mechanism in said objective unit is arranged, an annular member provided with a plurality of serially arranged distance scales being rotatably adjustably mounted on the outer surface of said adjusting device.

3. In a photographic camera provided with an interchangeable objective unit and adapted to accommodate individual objective units of different focal lengths, a camera body, a diaphragm mechanism mounted in said objective unit, an adjusting device on said camera body provided with a part for detachably receiving said objective unit and for displacing it with its diaphragm mechanism in axial direction, a central shutter carried by said part whereby upon operation of said adjusting device said shutter being axially displaced with said part while the axial distance between said shutter and said diaphragm mechanism remains unchanged, said adjusting device extending concentrically about the optical axis of said objective unit and projecting forwardly from the front wall of said camera body at least to the place at which the diaphragm mechanism in said objective unit is arranged, an annular member provided with a plurality of serially arranged distance scales being rotatably adjustably mounted on the outer surface of said adjusting device, and means for locking said annular member selectively in position on said adjusting device.

4. In a photographic camera provided with an interchangeable objective unit and adapted to accommodate individual objective units of different focal lengths, a camera body, a diaphragm mechanism mounted in said objective unit, an adjusting device on said camera body provided with a part for detachably receiving said objective unit and for displacing it with its diaphragm mechanism in axial direction, a central shutter carried by said part whereby upon operation of said adjusting device said shutter being axially displaced with said part while the axial distance between said shutter and said diaphragm mechanism remains unchanged, said adjusting device extending concentrically about the optical axis of said objective unit and projecting forwardly from the front wall of said camera body at least to the place at which the diaphragm mechanism in said objective unit is arranged, each objective unit being provided with its own distance scale, and operative means for transferring the distance adjusting movement of said adjusting device to the distance scale of the objective unit which has been attached to said part of the adjusting device.

5. In a photographic camera provided with an interchangeable objective unit and adapted to accommodate individual objective units of different focal lengths, a camera body, a diaphragm mechanism mounted in said objective unit, an adjusting device on said camera body provided with a part for detachably receiving said objective unit and for displacing it with its diaphragm mechanism in axial direction, a central shutter carried by said part whereby upon operation of said adjusting device said shutter being axially displaced with said part while the axial distance between said shutter and said diaphragm mechanism remains unchanged, said adjusting device extending concentrically about the optical axis of said objective unit and projecting forwardly from the front wall of said camera body at least to the place at which the diaphragm mechanism in said objective unit is arranged, each objective unit being provided with its own distance scale, and operative means for transferring the distance adjusting movement of said adjusting device to the distance scale of the objective unit which has been attached to said part of the adjusting device, said operative means including a gearing arranged between a manually rotatable part of said adjusting device and rotatable ring on said objective unit, said rotatable ring being provided with said distance scale.

6. In a photographic camera provided with an interchangeable objective unit and adapted to accommodate individual objective units of different focal lenths, a camera body, a diaphragm mechanism mounted in said objective unit, an adjusting device on said camera body provided with a part for detachably receiving said objective unit and for displacing it with its diaphragm mechanism in axial direction, a central shutter carried by said part whereby upon operation of said adjusting device said shutter being axially displaced with said part while the axial distance between said shutter and said diaphragm mechanism remains unchanged, said adjusting device extending concentrically about the optical axis of said objective unit and projecting forwardly from the front wall of said camera body at least to the place at which the diaphragm mechanism in said objective unit is arranged, each objective unit being provided with its own distance scale, and operative means for transferring the distance adjusting movement of said adjusting device to the distance scale of the objective unit which has been attached to said part of the adjusting device, said operative means including an interiorly toothed manually rotatable annular member extending concentrically about the optical axis of said objective unit, a gearing meshing with said interiorly toothed annular member, a shaft extending parallel to said optical axis and driven by said gearing, and a ring having a distance scale thereon mounted on said objective unit and in driving connection with said shaft.

7. In a photographic camera provided with an interchangeable objective unit and adapted to accommodate individual objective units of different focal lengths, a camera body, a diaphragm mechanism mounted in said objective unit, an adjusting device on said camera body provided with a part for detachably receiving said objective unit and for displacing it with its diaphragm mechanism in axial direction, a central shutter carried by said part whereby upon operation of said adjusting device said shutter being axially displaced with said part while the axial distance between said shutter and said diaphragm mechanism remains unchanged, said adjusting device extending concentrically about the optical axis of said objective unit and projecting forwardly from the front wall of said camera body at least to the place at which the diaphragm mechanism in said objective unit is arranged, each objective unit being provided with its own distance scale, and operative means for transferring the distance adjusting movement of said adjusting device to the distance scale of the objective unit which has been attached to said part of the adjusting device, said operative means including an interiorly toothed manually rotatable anular member extending concentrically about the optical axis of said objective unit, a gearing meshing with said interiorly toothed annular member, a shaft extending parallel to said optical axis and driven by said gearing, and a ring having a distance scale thereon mounted on said objective unit and in driving connection with said shaft, said gearing being constructed and arranged to move in axial direction with said objective unit when the latter is adjusted by said adjusting device.

8. In a photographic camera provided with an interchangeable objective unit and adapted to accommodate individual objective units of different focal lengths, a camera body, a diaphragm mechanism mounted in said objective unit, an adjusting device on said camera body provided with a part for detachably receiving said objective unit and for displacing it with its diaphragm mechanism in axial direction, a central shutter carried by said part whereby upon operation of said adjusting device said shutter being axially displaced with said part while the axial distance between said shutter and said diaphragm mechanism remains unchanged, said adjusting device extending concentrically about the optical axis of said objective unit and projecting forwardly from the front wall of said camera body at least to the place at which the diaphragm mechanism in said objective unit is arranged, each objective unit being provided with its own distance scale, and operative means for transferring the distance adjusting movement of said adjusting device to the distance scale of the objective unit which has been attached to said part of the adjusting device, said operative means including a rod extending parallel to the optical axis of said objective unit and supported at one end by the camera body, the other end of said rod having rack teeth engaging a spur gear meshing with a crown gear extending concentrically around said optical axis, said crown gear operating a distance scale carrying ring on said objective unit.

9. In a photographic camera provided with an interchangeable objective unit and adapted to accommodate individual objective units of different focal lengths, a camera body, a diaphragm mechanism mounted in said objective unit, an adjusting device on said camera body provided with a part for detachably receiving said objective unit and for displacing it with its diaphragm mechanism in axial direction, a central shutter carried by said part whereby upon operation of said adjusting device said shutter being axially displaced with said part while the axial distance between said shutter and said diaphragm mechanism remains unchanged, said adjusting device extending concentrically about the optical axis of said objective unit and projecting forwardly from the front wall of said camera body at least to the place at which the diaphragm mechanism in said objective unit is arranged, an annular member provided with a plurality of serially arranged distance scales being rotatably adjustably mounted on the outer surface of said adjusting device, a fixed index mark adjacent said annular member, and depth of focal scales arranged to both sides of said fixed index mark.

References Cited in the file of this patent
UNITED STATES PATENTS

| | | |
|---|---|---|
| 1,637,213 | Bornmann | July 26, 1927 |
| 2,887,937 | Gebele | May 26, 1959 |
| 2,926,576 | Gunther | Mar. 1, 1960 |
| 2,947,231 | Gebele | Aug. 2, 1960 |